(12) United States Patent
Tripathi (10) Patent No.: US 9,148,571 B2
(45) Date of Patent: Sep. 29, 2015

(54) IMAGE DISTORTION CORRECTION IN SCALING CIRCUIT

(75) Inventor: Brijesh Tripathi, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 152 days.

(21) Appl. No.: 13/617,428

(22) Filed: Sep. 14, 2012

(65) Prior Publication Data

US 2014/0078324 A1 Mar. 20, 2014

(51) Int. Cl.
*H04N 5/232* (2006.01)

(52) U.S. Cl.
CPC .......... *H04N 5/2329* (2013.01); *H04N 5/23258* (2013.01); *H04N 5/23267* (2013.01); *H04N 5/23274* (2013.01)

(58) Field of Classification Search
CPC ............ H04N 5/2329; H04N 5/23258; H04N 5/23274; H04N 5/23267
USPC ....................................... 348/208.1
See application file for complete search history.

(56) References Cited

U.S. PATENT DOCUMENTS

| 8,179,446 | B2 * | 5/2012 | Hong et al. ................ 348/208.6 |
|---|---|---|---|
| 2007/0120997 | A1 | 5/2007 | Sasaki et al. |
| 2008/0166115 | A1 | 7/2008 | Sachs et al. |
| 2009/0160957 | A1 * | 6/2009 | Deng et al. ............... 348/208.99 |
| 2009/0190846 | A1 * | 7/2009 | Mevissen ...................... 382/236 |
| 2009/0201383 | A1 | 8/2009 | Slavin |
| 2011/0090371 | A1 * | 4/2011 | Cote et al. ..................... 348/237 |
| 2011/0102465 | A1 | 5/2011 | Cho et al. |
| 2012/0002890 | A1 | 1/2012 | Mathew |
| 2012/0019660 | A1 * | 1/2012 | Golan et al. .................. 348/144 |
| 2012/0092559 | A1 | 4/2012 | Ubillos |
| 2012/0224072 | A1 | 9/2012 | Koo et al. |
| 2012/0236124 | A1 * | 9/2012 | Aoki .............................. 348/47 |

FOREIGN PATENT DOCUMENTS

| TW | 310414 | 7/1997 |
|---|---|---|
| TW | I283396 | 7/2007 |
| TW | I335180 | 12/2010 |
| TW | I337250 | 2/2011 |
| WO | 2007045714 | 4/2007 |

OTHER PUBLICATIONS

International Search Report and Written Opinion in Application No. PCT/US2013/059487 mailed Nov. 19, 2013, 16 pages.
International Preliminary Report in PCT Application No. PCT/US2013/059487 mailed Mar. 26, 2015, 13 pages.
Office Action in Taiwanese Application No. 102133394 dated Feb. 15, 2015, 12 pages.

* cited by examiner

*Primary Examiner* — James Hannett
(74) *Attorney, Agent, or Firm* — Meyertons, Hood, Kivlin, Kowert & Goetzel, P.C.

(57) ABSTRACT

Techniques relating to correction of image distortion caused by movement of a camera unit during image capture. In one embodiment, an apparatus may include a camera unit and a scaling circuit. The apparatus may be configured to calculate a shift value for a line of an image captured by the camera unit, where the shift value is indicative of an amount of movement of the camera unit during at least a portion of capture of the image. The scaling circuit may be configured to operate on the line starting at a line position that is based on the calculated shift value. The calculated shift value may be based on movement information generated by a motion sensor. The scaling circuit may include a digital differential analyzer and one or more multi-tap polyphase filters. The line position may be specified as a fractional pixel value.

23 Claims, 6 Drawing Sheets

| Current DDA Condition | Pixel Position at each Tap $X_W$=Input Width | | | | | | | | |
|---|---|---|---|---|---|---|---|---|---|
| | -4 | -3 | -2 | -1 | 0 | +1 | +2 | +3 | +4 |
| DDA<0.5 | 0 | 0 | 0 | 0 | 0 | 1 | 2 | 3 | 4 |
| 0.5<=DDA<1.5 | 0 | 0 | 0 | 0 | 1 | 2 | 3 | 4 | 5 |
| 1.5<=DDA<2.5 | 0 | 0 | 0 | 1 | 2 | 3 | 4 | 5 | 6 |
| 2.5<=DDA<3.5 | 0 | 0 | 1 | 2 | 3 | 4 | 5 | 6 | 7 |
| 3.5<=DDA<4.5 | 0 | 1 | 2 | 3 | 4 | 5 | 6 | 7 | 8 |
| ... | | | | | | | | | |
| for I=4... ($X_W$-5) (I-0.5)<=DDA<($X_W$-5.5) | I-4 | I-3 | I-2 | I-1 | I | I+1 | I+2 | I+3 | I+4 |
| ($X_W$-5.5)<=DDA<($X_W$-4.5) | $X_W$-9 | $X_W$-8 | $X_W$-7 | $X_W$-6 | $X_W$-5 | $X_W$-4 | $X_W$-3 | $X_W$-2 | $X_W$-1 |
| ($X_W$-4.5)<=DDA<($X_W$-3.5) | $X_W$-8 | $X_W$-7 | $X_W$-6 | $X_W$-5 | $X_W$-4 | $X_W$-3 | $X_W$-2 | $X_W$-1 | $X_W$-1 |
| ($X_W$-3.5)<=DDA<($X_W$-2.5) | $X_W$-7 | $X_W$-6 | $X_W$-5 | $X_W$-4 | $X_W$-3 | $X_W$-2 | $X_W$-1 | $X_W$-1 | $X_W$-1 |
| ($X_W$-2.5)<=DDA<($X_W$-1.5) | $X_W$-6 | $X_W$-5 | $X_W$-4 | $X_W$-3 | $X_W$-2 | $X_W$-1 | $X_W$-1 | $X_W$-1 | $X_W$-1 |
| ($X_W$-1.5)<=DDA<($X_W$-1.0) | $X_W$-5 | $X_W$-4 | $X_W$-3 | $X_W$-2 | $X_W$-1 | $X_W$-1 | $X_W$-1 | $X_W$-1 | $X_W$-1 |

IMAGE DISTORTION CORRECTION IN SCALING CIRCUIT

BACKGROUND

1. Technical Field

This disclosure relates generally to image processing, and more particularly to correcting image distortion caused by camera movement.

2. Description of the Related Art

Some cameras capture images by scanning lines of pixels from top to bottom (or bottom to top, left to right, etc.), which is often referred to as a "rolling shutter." Such cameras are often included in mobile devices such as cell phones and tablet computers. Because the scanning is not instantaneous, small user hand movements can cause distortions in the captured image. For example, pixels that should be vertically aligned are actually offset from each other such that an object that should appear to be upright appears to be slanted in the captured image. Image signal processors may be able to correct this problem based on image data, but such processing is slow and expensive in terms of power consumption. Similarly, software solutions to rolling shutter distortions tend be slow.

SUMMARY

This disclosure relates to correction of image distortion caused by movement of a camera unit during image capture. In one embodiment, an apparatus includes a camera unit and a scaling circuit. The apparatus may be configured to calculate a shift value for a line of an image captured by the camera unit, where the shift value is indicative of an amount of movement of the camera unit during at least a portion of capture of the image. The scaling circuit may be configured to operate on the line starting at a line position that is based on the calculated shift value which may correct distortion in the image.

In some embodiments, the camera unit captures images by scanning lines of pixels sequentially. The calculated shift value may be based on movement information generated by a motion sensor during capture of the image. The scaling circuit may include a digital differential analyzer and one or more multi-tap polyphase filters. The line position may be specified as a fractional pixel value.

In some embodiments, the camera unit captures a larger image than a desired image size in order to allow the scaling circuit to discard unused pixels preceding the line position. In other embodiments, the scaling circuit is configured to scale the line using a scaling factor greater than one to compensate for unused pixels preceding the line position. In some embodiments, the scaling factor is dynamically determined.

For example, consider a situation in which a camera unit captures lines of pixels from top to bottom and is moved to the left during image capture, causing a shift of 100 pixels (i.e., pixels in the top line and the bottom line that should be in the same column of pixels are about 100 columns apart). Assume that the captured image includes 200 horizontal lines of pixels. In this example, one embodiment of the apparatus may calculate an average shift value of 0.5 pixels per line. The line position for the first (topmost) line may be zero. The line position for the second line may be 0.5 pixels. The line position for the third line may be 1.0 pixels, and so on until the last (bottom) line has a line position of 99.5, thus aligning pixels correctly to correct image distortion. In another embodiment, the apparatus may calculate a shift value for each line based on motion information from one or more motion sensors corresponding to capture of that line, or may calculate multiple shift values during image capture and linearly interpolate to obtain a shift value for each line.

This specification includes references to "one embodiment," "an embodiment," "one implementation," or "an implementation." The appearances of these phrases do not necessarily refer to the same embodiment or implementation. Particular features, structures, or characteristics may be combined in any suitable manner consistent with this disclosure.

Various elements may be described herein as "configured to" perform one or more tasks. This term is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

Further, as used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Figure 1A:
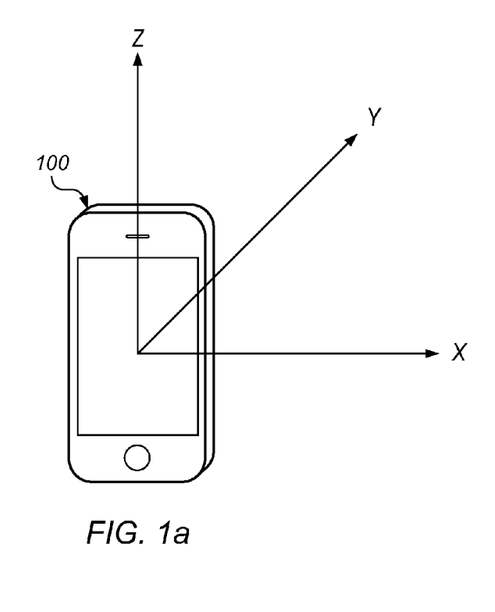
FIG. 1a is a diagram illustrating one embodiment of a mobile device.

Referring to FIG. 1a, a diagram illustrating a mobile device 100 is shown. In the illustrated embodiment, device 100 is a mobile phone, but in other embodiments, device 100 could be a tablet computing device, laptop, camera, mobile gaming device, vehicle, etc. FIG. 1a includes X, Y, and Z axes. In one embodiment, device 100 includes a camera unit with a camera pointing in the Y direction. In one embodiment, the camera uses a rolling shutter methodology to capture images by scanning lines of pixels from top to bottom (or bottom to top, left to right, etc.). Small hand movements by a user during capture of an image may cause distortion in the image. For example, shifts in the positive or negative X direction and/or rotations about the Z axis may cause substantial distortion when a rolling shutter scans from top to bottom or bottom to top. Other types of movement and/or movement of objects being photographed may also cause such "rolling shutter distortion." In various embodiments, various devices may include a camera unit that captures distorted images because of movement of the camera unit during image capture.

Figure 1B:
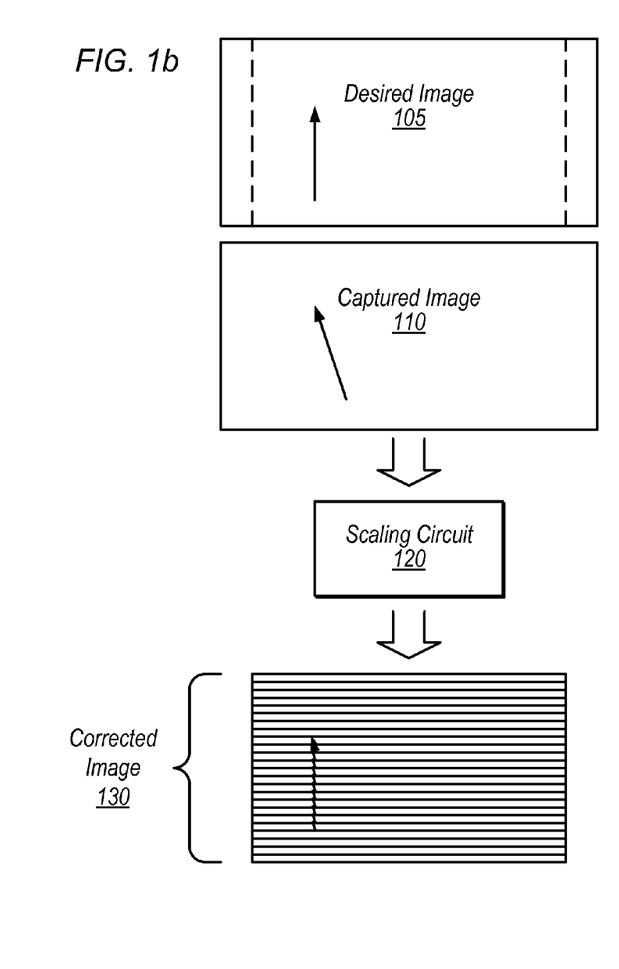
FIG. 1b is a block diagram illustrating exemplary processing of an image in a scaling circuit.

Turning now to FIG. 1b, a diagram illustrating exemplary processing of an image to correct distortion caused by movement of a camera unit during capture of the image is shown. The arrow in captured image 110 is slanted or skewed instead of upright as in desired image 105. An image such as captured image 110 may be captured by device 100 if the device 100 is moved in the negative X direction and/or rotated counter-clockwise about the Z axis during image capture. Captured image 110 may be stored in a memory. In one embodiment, scaling circuit 120 processes the image to generate corrected image 130. In the illustrated embodiment, scaling circuit 120 processes the image in strips, where each strip includes a plurality of horizontal lines of pixels. In other embodiments, scaling circuit 120 may process the image on a per-line basis, which may provide better distortion correction than processing the image in strips. In some embodiments, scaling circuit 120 may process vertical lines and/or strips of pixels instead of, or in addition to, horizontal lines and/or strips of pixels.

In various embodiments, scaling circuit 120 may specify a starting line position for a line or strip of the image based on a calculated shift value. As used herein, the term "shift value" refers to a determined difference between a desired alignment of pixels in an image and their actual alignment; this value may be expressed in any suitable manner, including as a distance or a number of pixels. For example, consider a situation in which an image is captured of a scene with first and second features that are vertically aligned. However, the first feature may appear to be located to the left of the second feature in the captured image due to distortion caused by movement during image capture. In this situation, a shift value refers to the distance between the desired position of the first feature and the actual position of the first feature (aligned with the second feature). In one embodiment, this distance may be specified in units of pixels of the image. In some embodiments, multiple shift values corresponding to multiple portions of an image may be determined.

Scaling circuit 120 may store corrected image 130 in memory. The dotted lines in desired image 105 emphasize the fact that corrected image 130 is not as wide as the desired image 105. In some embodiments, a camera unit may capture a larger image than desired in order to avoid this issue. In other embodiments, scaling circuit 120 may scale the image during distortion correction in order to obtain a desired image size. In some embodiments, such correction of rolling shutter distortion by scaling circuit 120 may reduce power consumption and/or processing time compared to other correction methodologies.

Figure 2:
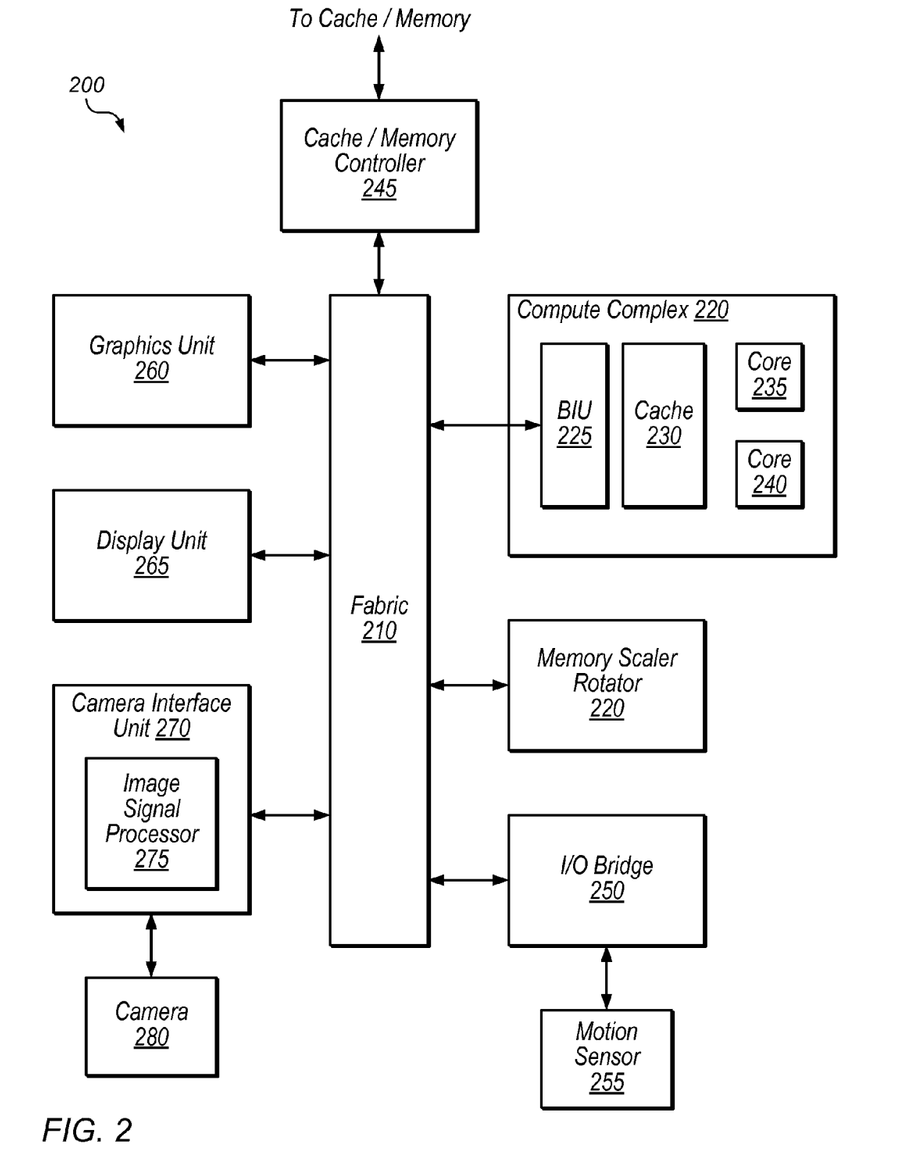
FIG. 2 is a block diagram illustrating one embodiment of a device that includes a memory scaler rotator.

Turning now to FIG. 2, a block diagram illustrating an exemplary embodiment of a device 200 is shown. In some embodiments, elements of device 200 may be included within a system on a chip. In some embodiments, device 200 may be included in a mobile device such as the mobile phone 100 of FIG. 1a. Device 200 includes fabric 210, compute complex 220, memory scaler rotator 220, input/output (I/O) bridge 250, motion sensor 255, cache/memory controller 245, graphics unit 260, display unit 265, camera interface unit 270, and camera 280.

Fabric 210 may include various interconnects, buses, MUX's, controllers, etc., and may be configured to facilitate communication between various elements of device 200. In some embodiments, portions of fabric 210 may be configured to implement various different communication protocols. In other embodiments, fabric 210 may implement a single communication protocol and elements coupled to fabric 210 may convert from the single communication protocol to other communication protocols internally.

In the illustrated embodiment, compute complex 220 includes bus interface unit (BIU) 225, cache 230, and cores 235 and 240. In various embodiments, compute complex 220 may include various numbers of cores and/or caches. For example, compute complex 220 may include 1, 2, or 4 processor cores, or any other suitable number. In one embodiment, cache 230 is a set associative L2 cache. In some embodiments, cores 235 and/or 240 may include internal instruction and/or data caches. In some embodiments, a coherency unit (not shown) in fabric 210, cache 230, or elsewhere in device 200 may be configured to maintain coherency between various caches of device 200. BIU 225 may be configured to manage communication between compute complex 220 and other elements of device 200. Processor cores such as cores 235 and 240 may be configured to execute instructions of a particular instruction set architecture (ISA) such as ARM®, INTEL® 64, IA-32, AMD 64®, POWERPC®, or MIPS®, for example.

In some embodiments, processor cores such as core 235 may be configured to execute program instructions of various programs. Some programs may implement various methodologies for correcting rolling shutter distortion. However, core 235 may consume considerable power and execution of such programs may be time-consuming. Therefore, rolling shutter correction in another element may be desirable.

Cache/memory controller 245 may be configured to manage transfer of data between fabric 210 and one or more caches and/or memories. For example, cache/memory controller 245 may be coupled to an L3 cache, which may in turn be coupled to a system memory. In other embodiments, cache/memory controller 245 may be directly coupled to a memory. In some embodiments, cache/memory controller 245 may include one or more internal caches.

As used herein, the term "coupled to" may indicate one or more connections between elements, and a coupling may include intervening elements. For example, in FIG. 2, memory scaler rotator 220 may be described as "coupled to" a memory through fabric 210 and cache/memory controller 245. In contrast, in the illustrated embodiment of FIG. 2, memory scaler rotator 220 is "directly coupled" to fabric 210 because there are no intervening elements.

Graphics unit 260 may include one or more processors and/or one or more graphics processing units (GPU's). Graphics unit 260 may receive graphics-oriented instructions, such OPENGL® or DIRECT3D® instructions, for example. Graphics unit 260 may execute GPU instructions or perform other operations based on the received graphics-oriented instructions. Graphics unit 260 may generally be configured to process large blocks of data in parallel and may build images in a frame buffer for output to a display. Graphics unit 260 may include transform, lighting, triangle, and/or rendering engines in one or more graphics processing pipelines. Graphics unit 260 may output pixel information for display images.

In some embodiments, graphics unit 260 may be configured to execute graphics oriented instructions of programs for correcting rolling shutter distortion. However, graphics unit 260 may consume considerable power and may not include hardware configured to efficiently perform such operations. Therefore, rolling shutter correction in another element may be desirable (or alternately, inclusion within a graphics unit of a scaling circuit according to the present disclosure may be desirable).

Display unit 265 may be configured to read data from a frame buffer and provide a stream of pixel values for display. Display unit 265 may be configured as a display pipeline in some embodiments. Additionally, display unit 265 may be configured to blend multiple frames to produce an output frame. Further, display unit 265 may include one or more interfaces (e.g., MIPI® or embedded display port (eDP)) for coupling to a user display (e.g., a touchscreen or external display).

I/O bridge 250 may include various elements configured to implement: universal serial bus (USB) communications, security, audio, and/or low-power always-on functionality, for example. I/O bridge 250 may also include interfaces such as pulse-width modulation (PWM), general-purpose input/output (GPIO), serial peripheral interface (SPI), and/or inter-integrated circuit (I2C), for example.

In the illustrated embodiment, I/O bridge 250 is coupled to motion sensor 255. Motion sensor 255 may include one or more accelerometers, one or more gyroscopes, and/or other sensors. In one embodiment, I/O bridge 250 is coupled to motion sensor 255 through an SPI interface. In other embodiments, I/O bridge 250 may be coupled to motion sensor 255 using various other appropriate interfaces. In one embodiment, motion sensor 255 includes an accelerometer configured to measure acceleration of device 200 in one or more directions. In one embodiment, the accelerometer is a 3-axis accelerometer. In one embodiment, motion sensor 255 includes a gyroscope configured to measure orientation of device 200. In one embodiment, the gyroscope is a 3-axis gyroscope. In various embodiments, information from motion sensor 255 is available to various elements of system 200 through fabric 210 and I/O bridge 250.

In some embodiments, motion sensor 255 may include a plurality of sensors including accelerometers and gyroscopes that may detect motion independently or in concert. Referring to the reference directions illustrated in FIG. 1a, motion sensor 255 may be configured to measure changes in velocity in the X, Y, and Z directions and rotation about these axes. In various embodiments, desired motion information may be measured directly or measured indirectly by capturing other motion data and calculating desired motion information. For example, orientation may be accumulated over time to calculate rotation during a specified interval. In various embodiments, desired motion information may be approximated based on motion information generated by motion sensors. In some embodiments, motion sensor 255 is configured to measure (either directly or indirectly) and/or approximate velocity and/or change in rotation of device 200 during capture of an image.

For example, in one embodiment, camera 280 is configured to capture images using a rolling shutter methodology. In the illustrated embodiment, camera interface unit 270 includes an image signal processor 275 and is coupled to camera 280. In one embodiment, camera 280 is coupled to camera interface unit 270 through a MIPI® camera interface. In some embodiments, camera interface unit 270 receives captured images from camera 280 and image signal processor 275 is configured to process captured image data. Image signal processor 275 may be configured to correct rolling shutter distortion based on image data. However, such correction may be slow, may consume significant power, and may produce unsatisfactory results. Therefore, rolling shutter correction in another element may be desirable.

Camera 280 may use complimentary metal-oxide-semiconductor (CMOS) sensors and may capture rows of pixels in a rolling shutter manner. A camera pixel may include a photodiode and multiple CMOS transistors. Camera 280 may include several hundred rows of pixels or more. Image capture may require $\frac{1}{60}^{th}$ of a second, for example. Camera 280 may scan pixels from top to bottom, bottom to top, left to right, and/or right to left in various rolling shutter embodiments.

Memory scaler rotator 220 may be configured to read image data from a memory, perform at least scaling and/or rotation operations on the image data, and write the image data back to the memory (e.g. through fabric 210 and cache/memory controller 245). In some embodiments, memory scaler rotator 220 is configured to correct distortion in an image caused by movement of device 200 during image capture using a scaling circuit.

Figure 3:
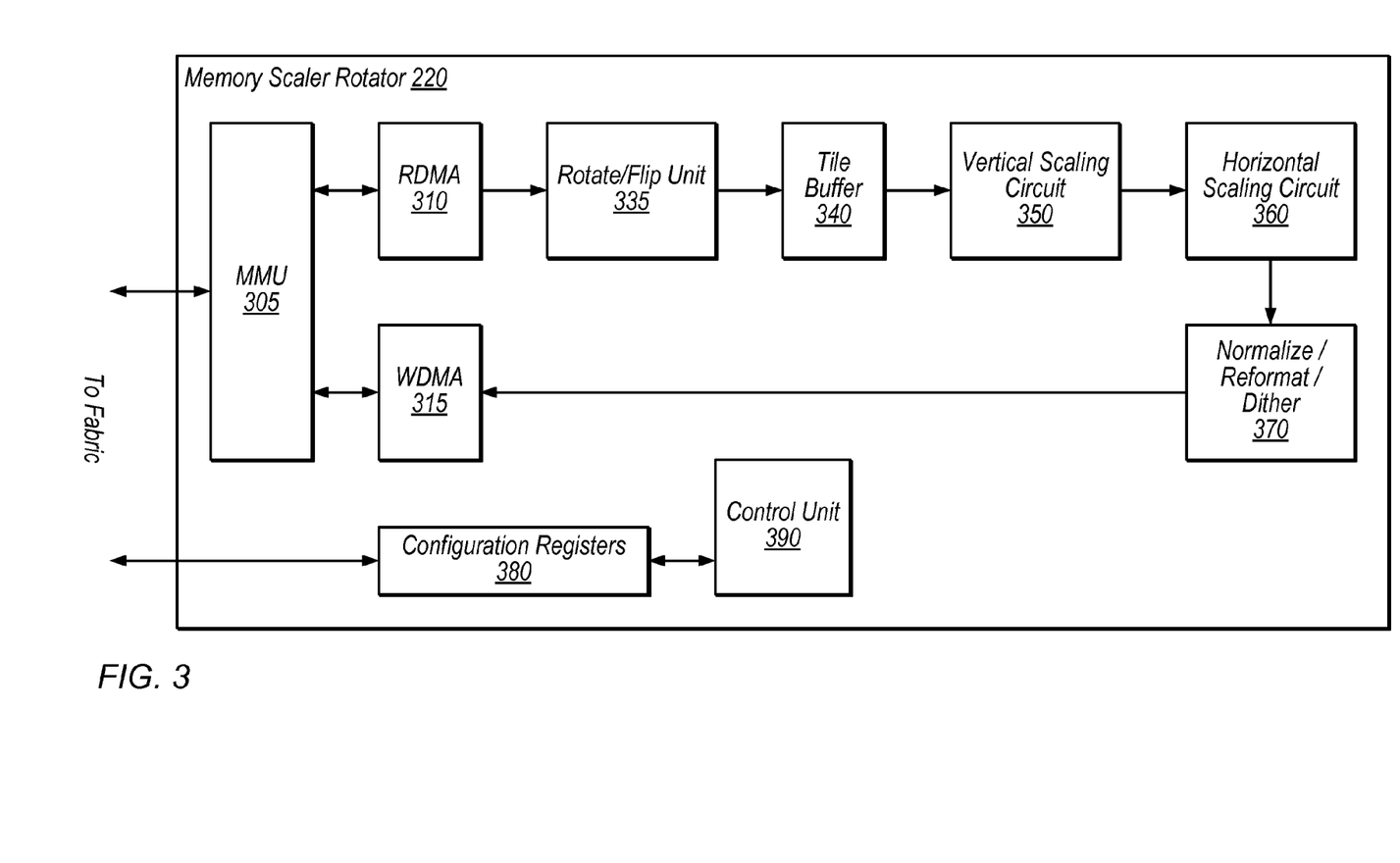
FIG. 3 is a block diagram illustrating one embodiment of a memory scaler rotator that includes scaling circuits.

Turning now to FIG. 3, a block diagram illustrating one embodiment of memory scaler rotator 220 is shown. In the illustrated embodiment, memory scaler rotator 220 includes memory management unit (MMU) 305, read direct memory access interface (RDMA) 310, write direct memory access interface (WDMA) 315, rotate/flip unit 335, tile buffer 340, vertical scaling circuit 350, horizontal scaling circuit 360, normalize/reformat/dither element 370, configuration registers 380, and control unit 390. In some embodiments, memory scaler rotator 220 may be configured to receive image data from memory through RDMA 310 and process the image data using elements 335-370, then write the image back to memory. Other elements of device 200 (e.g., core 235) may write to configuration registers 380 in order to configure processing of an image in memory scaler rotator 220. Control unit 390 may be coupled to various elements of memory scaler rotator 220 (couplings not shown) and may control processing of an image based on information in configuration registers 380. Vertical scaling circuit 350 and/or horizontal scaling circuit 360 may correspond to the scaling circuit 120 of FIG. 1b and may be configured to correct distortion in an image.

MMU 305 may be configured to manage transfer of data between RDMA 310 and WDMA 315 and caches or memory. For example, MMU 305 may be configured to perform memory address translation for requests issued by RDMA 310 and WDMA 315.

RDMA 310 may be configured to fetch (and/or prefetch) image data from a cache or memory and buffer image data. RDMA 310 may fetch data using linear addressing or tile-based addressing. RDMA 310 may be configured to convert image data from a source format, e.g., using bit expansion or swizzling. RDMA 310 may fetch different image information (e.g., information corresponding to greater or lesser numbers of pixels per line/block of an image) based on information in configuration registers 380 (e.g. based on whether an image should be rotated).

Rotate/flip unit 335 may be configured to rotate and/or flip an image based on information in configuration registers 380. Rotate/flip unit 335 may be configured to rotate an image in increments of 90 degrees and/or flip an image vertically or horizontally. Rotate/flip unit 335 may include one or more rotation buffers for storing image data.

Tile buffer 340 may be configured to store tiles of an image. For example, an image may be divided into and/or address as a grid of tiles, each tile containing an implementation-dependent number of rows and columns of pixels. In other embodiments, tile buffer 340 may be implemented as a line buffer to store lines of an image. In yet other embodiments, tile buffer 340 may be implemented as a strip buffer to store strips that include multiple lines of an image. Buffering portions of an image may facilitate rotation and/or scaling of the image.

Horizontal scaling circuit 360 may be configured to process horizontal lines of pixels. Scaling may refer to changing the pixel resolution of an image. For example, an image that is 200 pixels wide by 100 pixels tall could be horizontally scaled down to 100 by 100 pixels using a scaling factor of 0.5 or horizontally scaled up to 400 by 100 pixels using a scaling factor of 2. Scaling circuits may be configured to generate output pixel components (R, G, B) in a scaled image based on characteristics of nearby pixels in the original image.

In one embodiment of horizontal scaling circuit 360, horizontal scaling is accomplished via three separate 9-tap polyphase filters, one for each pixel component (R, G, B). The filters may use a shared digital differential analyzer (DDA) to control the stepping of the current center pixel and the index for the coefficients. The DDA may start each line based on a value referred to as DDAInit, and may be incremented by a value DDAStep for each subsequent output pixel. (In one implementation, DDAStep is programmed so that the input width divided by the DDAStep equals the output width.) In one embodiment, input pixels enter one end of a 9-entry shift register, making their way to the other end as subsequent pixels are received. When all the input pixels necessary for an output pixel are in the shift register (as determined from the DDA) the scaling calculation is performed, and the output pixel generated. A table describing the scaling process is described further below with reference to FIG. 4. Note that DDAinit may be specified as a fractional pixel value corresponding to a fractional pixel location in a line. A fractional pixel location refers to a line location that is between two pixels, e.g., a location at 2.1 pixels from the first pixel in a line, 4.7 pixels from the first pixel in a line, and so on. Horizontal scaling circuit 360 may generate pixel information for fractional pixel locations based on nearby pixels.

The DDA (Digital Differential Analyzer) may be used to control the current position during the scaling operation. In one embodiment, it is a 36-bit fixed-point number with 16 bits in the integer portion and 20 bits in the fraction. The 16-bit integer portion determines the current pixel position, while the fraction is used to index into a coefficient table. Horizontal scaling circuit 360 uses 16-phase coefficient tables (one table per tap), so only the upper four fractional bits (rounded) are used for the index. The same index may be used for each table.

Figure 4:
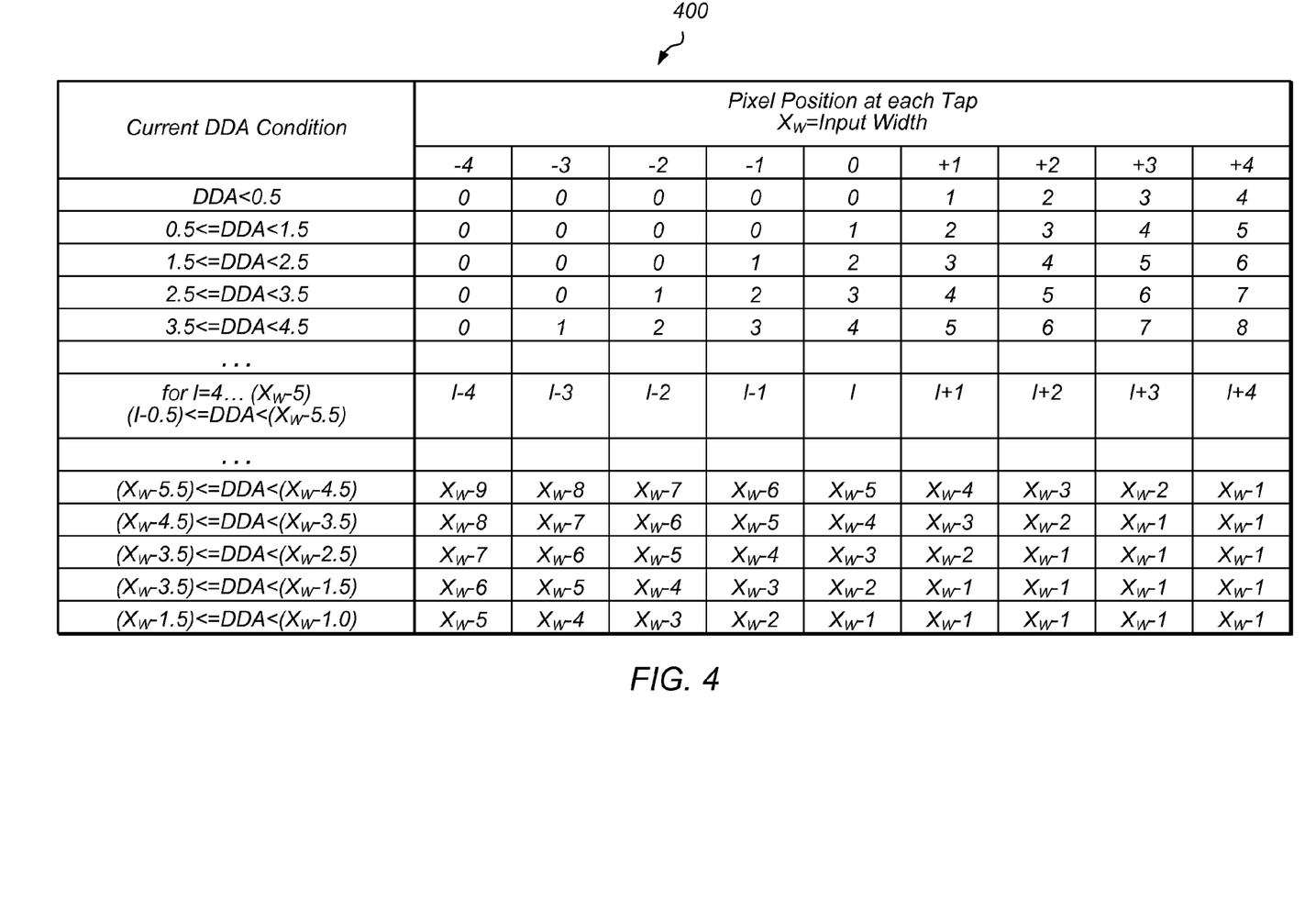
FIG. 4 is a table illustrating operation of one embodiment of a horizontal scaling circuit.

Each filter may multiply nine input pixel components (repeated when necessary) by nine coefficients drawn from the tables, and sum the results to form the destination pixel component. The results may be rounded as needed. For edge cases, the pixels that are used for filtering depend upon the relationship between the current DDA and either 0 (left edge) or the input width (right edge). When the DDA is close enough to the border that there are not enough pixels to perform the 9-tap filtering, then the border pixels are repeated. FIG. 4 is one example of a table that describes the pixels used for border cases. In various embodiments, various numbers of taps may be implemented by a scaling circuit such as horizontal scaling circuit 360.

Configuration registers 380 store parameters pertinent to horizontal scaling circuit 360. For example, in one embodiment, a DDA Initial Value Register may be used to set an initial value for DDAinit, which is used to set the initial scale location on each line. A DDA Step Value Register may contain a step value for the DDA (DDAStep), which is used to control horizontal scaling. Horizontal Scaler Coefficient Registers may contain 16-bit coefficient values used to perform the 9-tap horizontal scaling function. The registers may be organized as 9 tables of 16 entries each, corresponding to the 9 taps and 16 phases of horizontal scaling circuit 360. Embodiments where a scaling circuit such as horizontal scaling circuit 360 is configured to correct for image distortion will be described in detail shortly. In some embodiments, horizontal scaling circuit 360 is configured to correct distortion in portions of an image (e.g., strips or tiles) at a time.

Vertical scaling circuit 350 may be configured similarly to horizontal scaling circuit 360 as described above, except that vertical scaling circuit 350 is configured to process vertical lines of an image, i.e., lines with pixels from multiple horizontal rows of pixels. In one embodiment, vertical scaling circuit 350 is configured to correct for image distortion caused by movement of a camera unit during image capture. In various embodiments, vertical scaling circuit 350 may be configured to correct distortion using similar methodologies as will be described below for various embodiments of horizontal scaling circuit 360.

Normalize/reformat/dither element 370 may be configured to normalize color components of pixel data, convert color space, dither pixel data to a lower precision, skew pixel ranges, and so on, based on information in configuration registers 380.

WDMA 315 may be coupled to normalize/reformat/dither element 370 and MMU 305 and may be configured buffer image data and/or write image data to a cache or memory. WDMA 315 may be configured to convert image data to a destination format, e.g., using bit packing or swizzling.

Memory scaler rotator 220 may be configured to send and/or receive interrupts to/from elements of device 200. For example, in one embodiment, memory scaler rotator 220 may send an interrupt to processor core 235 to indicate that processing of an image is complete.

In one embodiment, memory scaler rotator 220 is configured to quickly correct for certain distortion in an image caused by movement of a camera unit during capture of the image. Rather than starting each line at the same initial scale location in horizontal scaling circuit 360 (e.g., as indicated by the DDA initial value register), memory scaler rotator 220 may start processing a line of an image at an initial scale location based on a shift value that is indicative of an amount of movement of a camera unit during capture of the image. For example, core 235 may calculate one or more shift values based on information from motion sensor 255 corresponding to movement of device 200 during capture of the image. Core 235 may write the shift value(s) to configuration registers 380. Based on the shift value(s), horizontal scaling circuit 360 may process different lines of the image using different initial scale locations. In one embodiment, core 235 calculates the shift value as an average shift value during capture of the image. In another embodiment, core 235 calculates multiple shift values during image capture, e.g., up to a shift value for each line of the image corresponding to movement during capture of that line.

Figure 5:
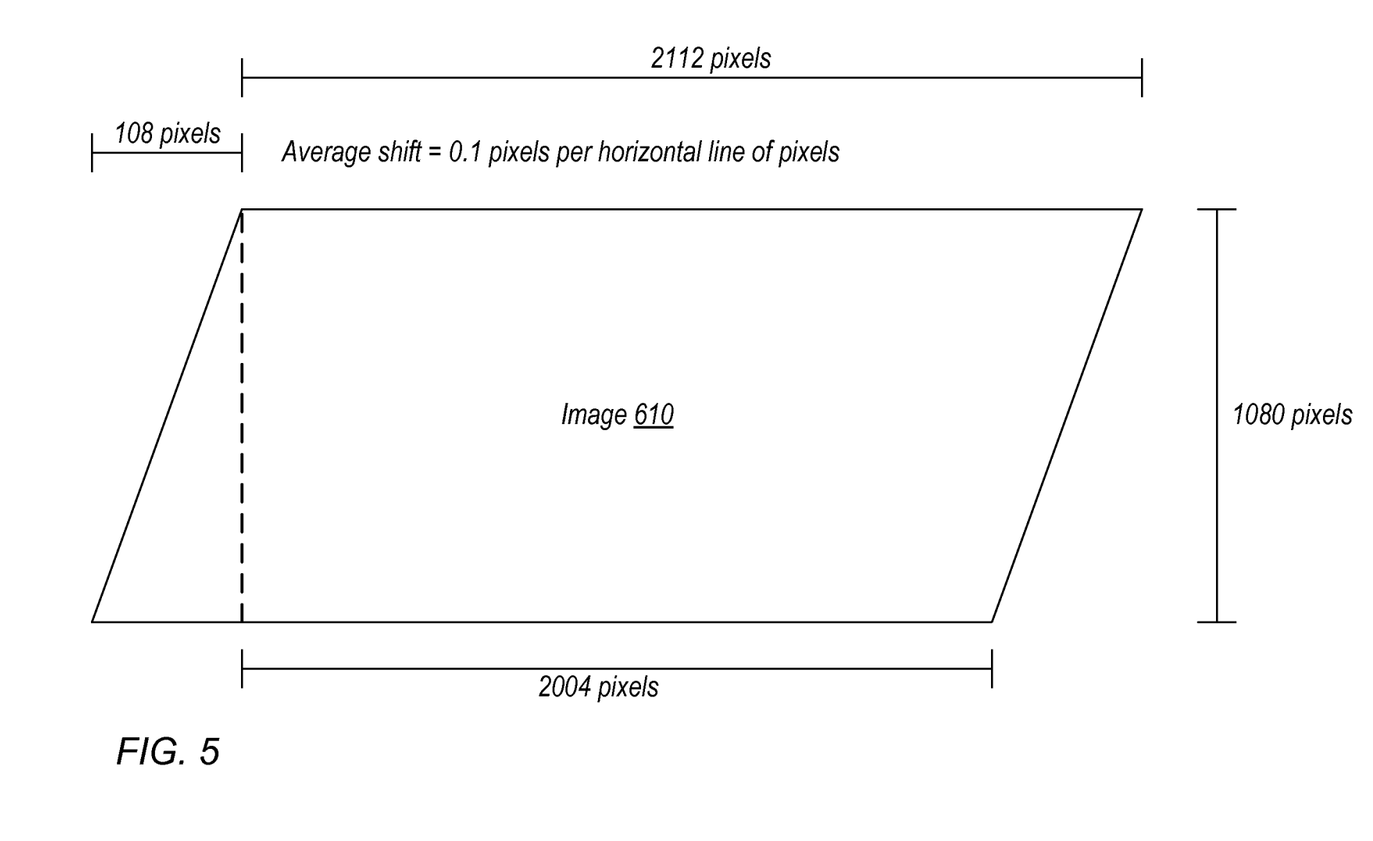
FIG. 5 is a diagram illustrating exemplary processing of a distorted image.

Referring now to FIG. 5, consider an exemplary situation in which movement of a camera unit during capture of image 610 corresponds to 108 pixels of the image (i.e. such a pixel in the top row of image 610 and a pixel in the bottom row of image 610 that should be in the same column are 108 columns apart). Image 610 is illustrated as a parallelogram to show distortion caused by movement of the camera unit during image capture. For example, referring to FIG. 1a, a camera of device 100 may capture an image similar to captured image 610 while moving in the negative X direction during capture. In this example situation, camera 280 captures 1080 horizontal lines of image data, each horizontal line including 2112 pixels. The desired image size may be 1920 by 1080 pixels and in one embodiment, camera 280 may capture a larger image with 2112 pixels in each horizontal line (in this case an extra 10%) in order to facilitate distortion correction. In various embodiments, capturing and processing of images using various widths and heights of camera pixels and various ratios between width and height is contemplated.

In one embodiment, in this exemplary situation, core 235 calculates a shift value of 0.1 pixels per line as an average shift value during capture of image 610. To calculate the average shift value of 0.1, core 235 may receive information from motion sensor 255 indicating the movement corresponding to 108 pixels during capture of the image 610. In FIG. 5, the vertical dotted line indicates desired starting line locations (i.e., DDAinit values or initial scale locations) based on the average shift of 0.1 pixels per line. In this example, horizontal scaling circuit 360 uses an initial scale location for line 1 (the top horizontal line) of pixel 0, an initial scale location for line 2 of pixel 0.1, an initial scale location for line 3 of 0.2, an initial scale location for line 4 of 0.3, and so on. As illustrated by FIG. 5, capturing extra horizontal pixels facilitates distortion correction in this manner, because after using an initial scale location of pixel 107.9 for line 1080, 2004.1 pixels are available in the remainder of line 1080 for scaling (which meets the desired width of 1920 pixels, so only 1920 pixels are actually used for each line in one embodiment).

In some embodiments, camera interface unit 270 may be configured to wait to capture an image until movement has subsided to a level such that the extra pixels captured are sufficient to correct distortion caused by the movement. In such embodiments, a scaling value may be set to 1 when correcting distortion. For example, the DDAstep may be set to 1. In other embodiments, camera 280 and/or camera interface unit 270 do not capture more pixels than required for a desired image size. Thus after correcting distortion with no scaling, the output image would be smaller than desired. In such embodiments, horizontal scaling circuit 360 may scale the image while correcting distortion, using a scaling factor of greater than one. In various embodiments, various appropriate scaling factors may be used to obtain a corrected image of the desired size. In one embodiment, the scaling factor is dynamically determined based on motion information from motion sensor 255. For example, greater camera motion may indicate that a greater scaling factor should be used in order to retain a desired image size after correction. In the example of FIG. 5, if 1920 pixels per horizontal line had been captured instead of 2112 pixels per horizontal line, a scaling factor of (1+108/1920 or 1.05625) could have been dynamically calculated and used to obtain a desired image width of 1920 pixels after distortion correction.

In another embodiment, core 235 calculates more than one shift value corresponding to capture of an image. For example, core 235 may calculate a shift value for each line of pixels in the image rather than an average shift value (e.g., based on movement information corresponding to capture of each line) in order to perform a more precise distortion correction. Alternately, core 235 may calculate more than one shift value, but less than N shift values where N is the number of lines of pixels in the image. In such embodiments, horizontal scaling circuit 360 processes lines of the images using line positions (i.e., initial scale locations or DDAinit values) based on the shift values. In this embodiment, core 235 may perform more calculations to determine shift values, but distortion correction may be improved. For example, consider a situation where device 200 moves substantially during a first half of image capture and does not move at all during a second half of image capture. In this instance, using multiple shift values allows better distortion correction than using a single average shift value (because one half of the image would remain or become skewed in the exemplary situation if only a single average shift value was used).

In one embodiment, memory scaler rotator 220 is configured to process images in strips, where each strip contains several lines of pixels. Such strips may be vertical strips or horizontal strips in various embodiments. In this embodiment, each strip is assigned a starting line position (i.e., initial scale location or DDAinit value) for all lines within the strip. An exemplary result of such an embodiment is illustrated by corrected image 130 of FIG. 1b. In another embodiment, memory scaler rotator 220 is configured to process images in tiles, where each tile contains a block of pixels. In this embodiment, each line of pixels within a tile is assigned a starting line position (i.e., initial scale location or DDAinit value) based on one or more calculated shift values. In this embodiment, various methodologies may be used to correct distortion as described elsewhere within this disclosure, but to correct tiles of an image at a time rather than the whole image.

Using a scaling circuit to correct image distortion may be advantageous because the scaling circuit may already include multi-tap filters, for example. Multi-tap filters and a digital differential analyzer a may allow the scaling circuit to process lines using fractional pixel starting line positions without complicated programming to deal with fractional pixels and obtain information regarding nearby pixels. Further, a scaling circuit may consume less power than other processing elements, and thus may be a power-efficient module for correcting distortion. Finally, in situations where image scaling is already being performed, distortion correction is essentially free in terms of power consumption and processing time. Similarly, in embodiments in which a scaling circuit is included in a memory scaler rotator, distortion correctly is also essentially free in situations in which image rotations are already being performed.

In some embodiments, vertical scaling circuit 350 may perform similar distortion correction instead of, or in addition to, horizontal scaling circuit 360. For example, if a rolling shutter scans lines of pixels from left to right or from right to left, vertical scaling circuit 350 may perform more significant distortion correction compared to horizontal scaling circuit 360 (i.e., distortion may typically be greater for vertical lines of pixels than for horizontal lines of pixels in this configuration). In various embodiments, scaling circuits may be configured to use various numbers of pixel taps in filters, various configurations of coefficient tables and coefficient values, and so on. Horizontal scaling circuit 360 is intended to illustrate one exemplary embodiment of a scaling circuit, but other implementations are contemplated.

Figure 6A:
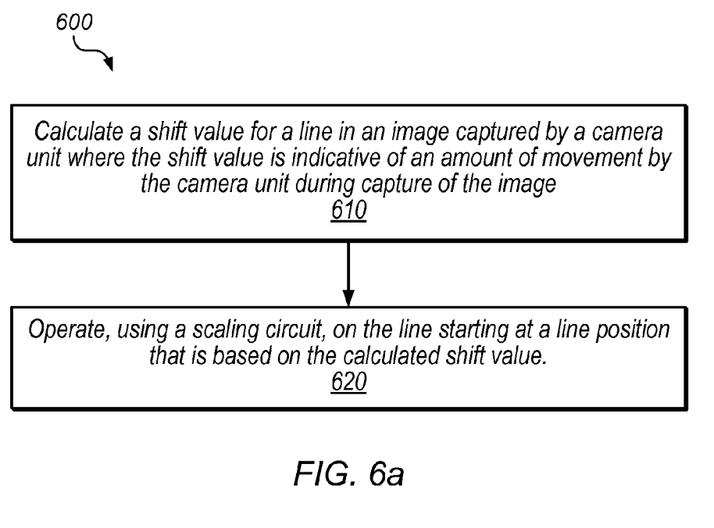
FIGS. 6a and 6b are flow diagrams illustrating respective embodiments of methods for correcting image distortion caused by movement of a camera unit during image capture using a scaling circuit.

Turning now to FIG. 6a, a flow diagram illustrating one embodiment of a method 600 for correcting image distortion caused by movement of a camera unit during image capture is shown. The method shown in FIG. 6a may be used in conjunction with any of the computer systems, devices, or components disclosed herein, among other devices. In various embodiments, some of the method elements shown may be performed concurrently, in a different order than shown, or may be omitted. Additional method elements may also be performed as desired. Flow begins at block 610.

At block 610 a shift value is calculated for a line in an image captured by a camera unit where the shift value is indicative of an amount of movement by the camera during capture of the image. In one embodiment, the shift value is calculated by a processor core such as core 235. In some embodiments, the shift value may be based on the length of a time interval corresponding to capture of the image, a number of pixels in the image, and/or information from motion sensor 255. The shift value may be an average shift value that applies to all lines of the image, or may correspond to a shift value for a particular portion of the image such as a line of pixels or a strip of several lines. Flow proceeds to block 620.

At block 620 a scaling circuit operates on the line starting at a line position that is based on the calculated shift value. The line position may be specified in fractions of a pixel. The line position may also be referred to as a DDAinit value or an initial scale location. In one embodiment, the scaling circuit resides within memory scaler rotator 220. In other embodiments, the scaling circuit resides elsewhere in system 200 such as within display unit 265 or directly coupled to fabric 210, for example. In one embodiment, the scaling circuit may not scale the line, i.e., a scaling factor may be one. In other embodiments, the scaling circuit scales the line (e.g., increases or decreases the number of pixels of the line), using one of various scaling factors. Flow ends at block 620.

Figure 6B:
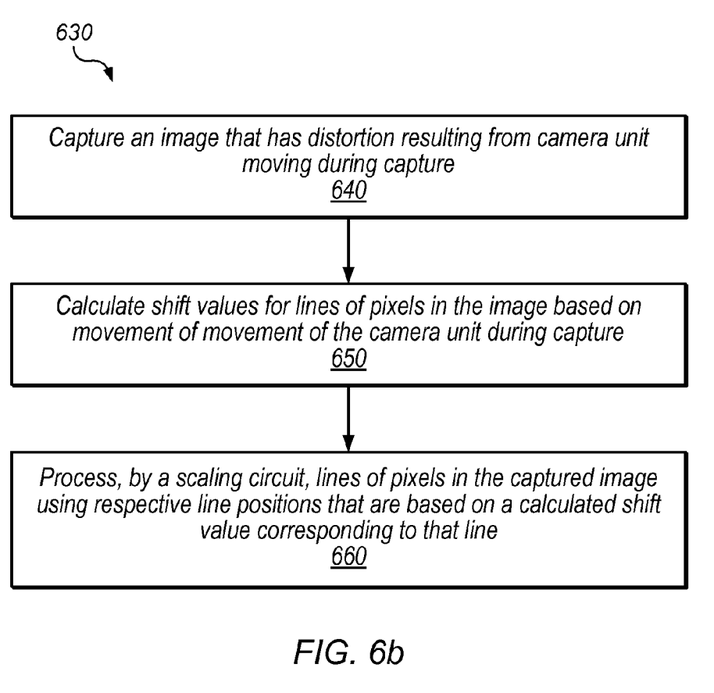

Turning now to FIG. 6b, a flow diagram illustrating one embodiment of a method 630 for correcting image distortion caused by movement of a camera unit during image capture is shown. The method shown in FIG. 6b may be used in conjunction with any of the computer systems, devices, or components disclosed herein, among other devices. In various embodiments, some of the method elements shown may be performed concurrently, in a different order than shown, or may be omitted. Additional method elements may also be performed as desired. Flow begins at block 640.

At block 640, an image is captured that has distortion resulting from a camera unit moving during capture of the image. The image may be captured using a rolling shutter methodology. In some embodiments, dimensions of the image may be greater than dimensions of a desired image size. Flow proceeds to block 650.

At block 650, shift values are calculated for lines of pixels in the image based on movement of the camera during image capture. In one embodiment, a shift value is calculated for each line based on movement information corresponding to movement of the camera unit during capture of that line. In another embodiment, one or more shift values are calculated as an average of camera movement during capture of multiple lines. In some embodiments, the calculating is performed by core 235 and/or core 240. Flow proceeds to block 660.

At block 660, a scaling circuit processes lines of pixels in the captured image using respective line positions that are based on the calculated shift value corresponding to that line. In one embodiment, the calculated shift value is based on motion of the camera unit during capture of that line. In other embodiments, the calculated shift value is based on motion of the camera unit during capture of multiple lines, including that line. In some embodiments, the scaling circuit also scales the image. In some embodiments, the line is scaled, and a scaling factor for scaling the image is dynamically determined, e.g., based on movement information. Flow ends at block 660.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   storing in a buffer, by an apparatus having a camera unit, an image captured by the camera unit, wherein the storing includes storing lines of pixels of the image in entries of the buffer;
   measuring, by the apparatus, an amount of movement of the camera unit during capture of the image;
   calculating, by the apparatus, a first number of pixels of the image, wherein the first number of pixels corresponds to the amount of movement of the camera;
   determining a starting pixel for a stored line in the image, wherein the starting pixel is offset from an end pixel of the line by a number of pixels that is determined based on the first number of pixels and the number of lines of pixels in the image; and
   scaling, by a scaling circuit in the apparatus, the line of pixels, wherein the scaling the line of pixels includes scaling the line of pixels beginning at the starting pixel.

2. The method of claim 1, wherein the measuring an amount of movement comprises measuring amount of movement by a motion sensor during capture of the image.

3. The method of claim 2, wherein the motion sensor comprises an accelerometer and a gyroscope.

4. The method of claim 1, further comprising the scaling circuit discarding one or more unused pixels preceding the starting pixel.

5. The method of claim 1, wherein the scaling includes using a scaling factor that is selected, based on the amount of movement of the camera unit during capture of the image, to generate a scaled line of pixels having a same size as the line of pixels.

6. An apparatus, comprising:
   buffer circuitry;
   a camera unit configured to capture an image; and
   a scaling circuit;
   wherein the apparatus is configured to:
      store lines of pixels of a captured image in the buffer circuitry;
      determine a first number of pixels of the image that corresponds to an amount of movement of the camera during at least a portion of capture of the image;
      calculate a shift value for a stored line of pixels in the image, wherein the calculated shift value is based on the first number of pixels and the number of lines of pixels in the image; and
   wherein the scaling circuit is configured to scale the line starting at a line position that is based on the calculated shift value, wherein the scaling uses a scaling factor greater than one.

7. The apparatus of claim 6, further comprising a motion sensor configured to determine the amount of movement of the camera.

8. The apparatus of claim 6, wherein the camera unit is configured to capture the image by scanning different lines of pixels at different points in time.

9. The apparatus of claim 8, wherein the camera unit includes complementary metal-oxide-semiconductor sensors.

10. The apparatus of claim 6, where the line position is specified as a fractional pixel position.

11. A method, comprising:
an apparatus having a camera unit capturing an image that has distortion resulting from the camera unit moving during capture of the image;
the apparatus correcting the distortion, wherein the correcting comprises:
determining a total number of pixels corresponding to movement of the camera unit during capture of the image;
calculating shift values for lines of pixels in the image, wherein the shift values are calculated based on the total number of pixels and a number of lines of pixels in the image; and
processing lines of pixels in the captured image, using a scaling circuit, starting with respective line positions that are based on the calculated shift value corresponding to that line;
wherein the processing uses a scaling factor for each line that is determined for the image based on the total number of pixels and the number of pixels in each line of pixels such that the processing produces an output line of pixels that has the same number of pixels as the captured line of pixels.

12. The method of claim 11, wherein the shift values correspond to an average shift value over capture of the image.

13. The method of claim 11, wherein the scaling factor is determined based on the calculated shift value to compensate for unused pixels preceding the respective line positions in order to retain a particular image size.

14. The method of claim 11, further comprising reading the image from a location in a memory before the processing and storing the image to the same location in the memory after the processing.

15. An apparatus, comprising:
buffer circuitry
a camera unit configured to capture an image, wherein the apparatus is configured to store lines of pixels of the captured image using the buffer circuitry;
a motion sensor unit configured to generate motion information during capture of the image;
a processing element configured to determine a number of pixels of the image corresponding to an amount of motion indicated by the motion information and calculate an initial scale location for a line of pixels of the image based on the number of pixels and a number of lines of pixels in the image; and
at least one scaling circuit configured to operate on the line of pixels starting at the initial scale location, wherein the operating generates a scaled line of pixels using a scaling factor that is dynamically determined for the image based on the motion information and the number of pixels in the line to generate an output line of pixels having a same size as the stored line of pixels.

16. The apparatus of claim 15, wherein the scaling circuit is included in a memory scaler rotator that comprises a plurality of configuration registers and is configured to:
read the image from a memory;
rotate the image based on values in one or more rotation configuration registers;
scale the image based on values in on one or more scale configuration registers and one or more initial scale location registers; and
write the image to the memory.

17. The apparatus of claim 16, wherein the processing element is configured to:
write to the one or more rotation configuration registers to indicate that no rotation should take place.

18. The apparatus of claim 15, wherein the apparatus further comprises a horizontal scaling unit and a vertical scaling unit;
wherein the line of pixels is a horizontal line of pixels;
wherein the horizontal scaling unit is configured to operate on the line of pixels starting at a line position that is based on the initial scale location; and
wherein the vertical scaling unit is configured to operate on a vertical line of pixels starting at a line position that is based on another initial scale location calculated by the processing element for the vertical line of pixels.

19. The apparatus of claim 15;
wherein the motion sensor unit comprises an accelerometer and a gyroscope;
wherein the apparatus further comprises a graphics processing unit; and
wherein the camera unit comprises an image signal processor.

20. An apparatus, comprising:
a camera unit configured to capture an image that has distortion resulting from movement of the camera unit during image capture; and
a scaling circuit;
wherein the apparatus is configured to calculate shift values for lines of pixels in the image, wherein the shift values are determined by dividing a total number of pixels corresponding to an amount of movement of the camera during image capture by the number of lines of pixels in the image; and
wherein the scaling circuit is configured to process lines of pixels in the captured image at respective line positions that are based on the calculated shift value for that line, including determining pixel attributes for a pixel in one of the processed lines based on multiple pixels in the line being processed.

21. The apparatus of claim 20, wherein the scaling circuit comprises a digital differential analyzer to process pixels of the lines of pixels.

22. The apparatus of claim 20, wherein the scaling circuit comprises one or more multiple-tap polyphase filters for processing pixels of the lines of pixels.

23. The apparatus of claim 20, wherein the apparatus is configured to linearly interpolate based on a plurality of movement measurements to calculate the shift values.

* * * * *